Dec. 31, 1968   G. U. BRUMBAUGH ET AL   3,419,099
TRUCK HOOD

Filed Nov. 7, 1966   Sheet 1 of 5

INVENTORS
GEORGE U. BRUMBAUGH
LARRY S. SHERMAN
HIDEO FURIYA
BY
Owen, Wickersham & Erickson
ATTORNEYS

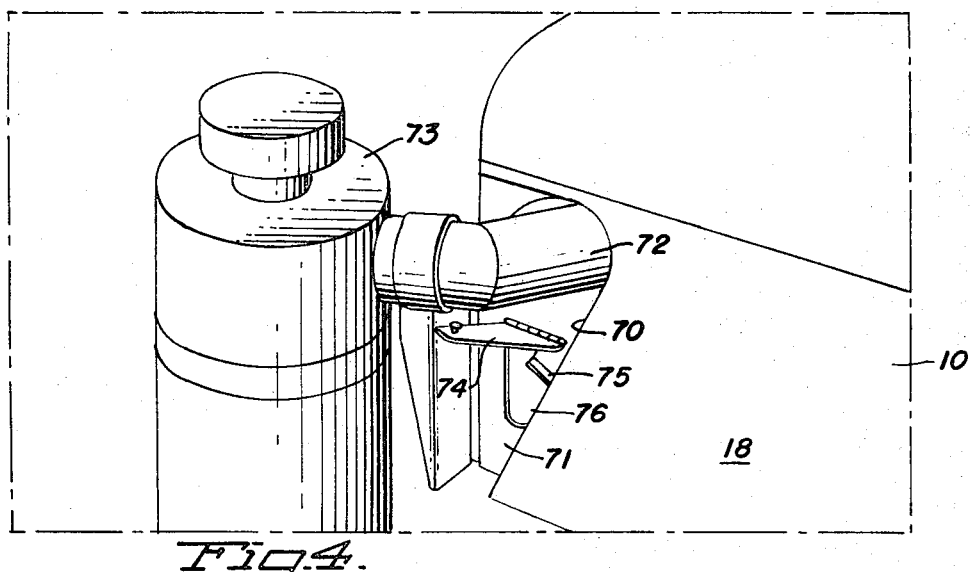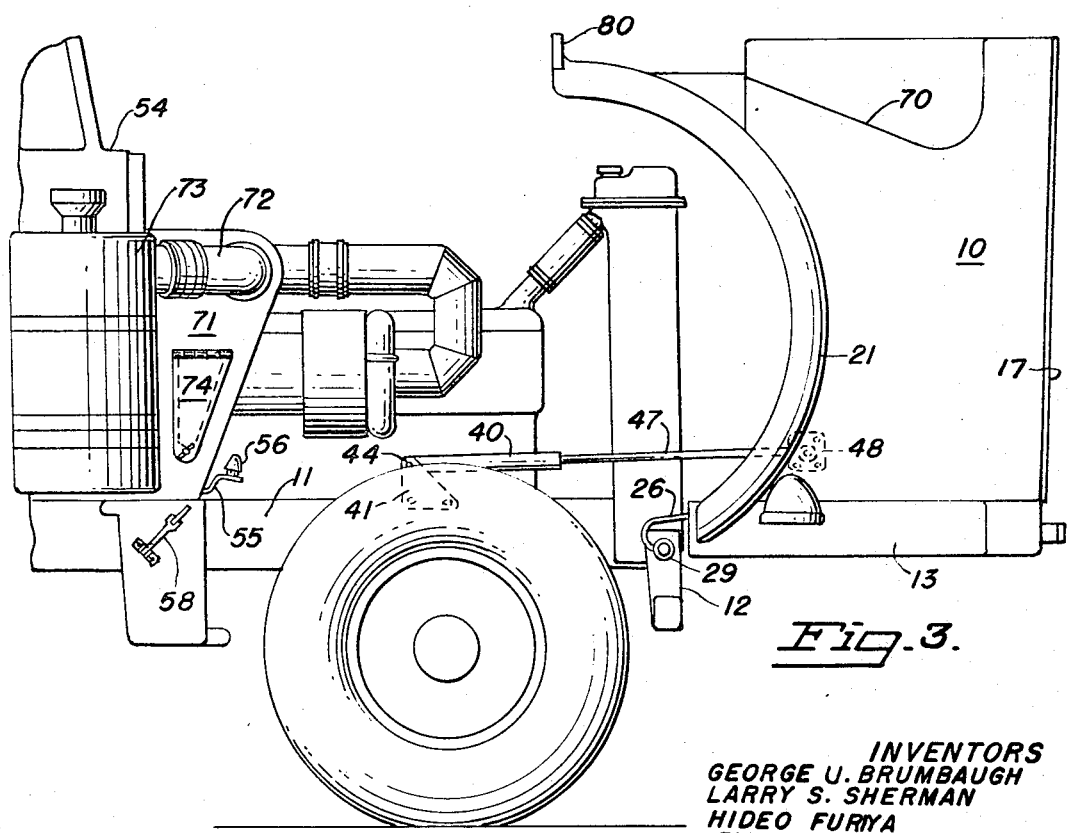

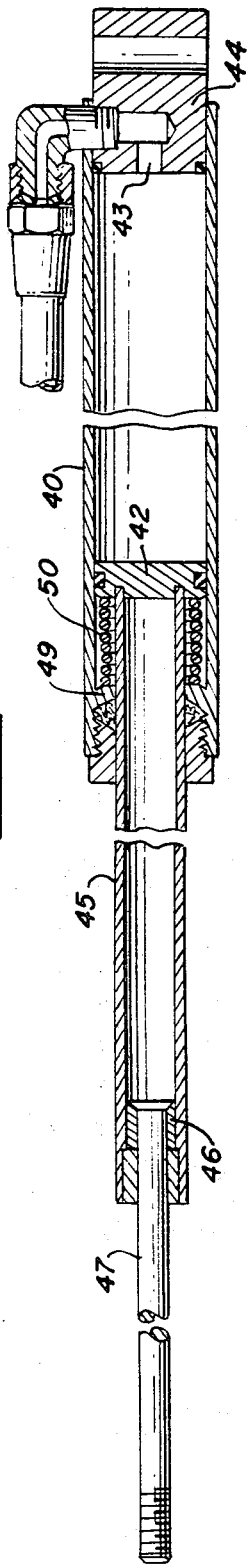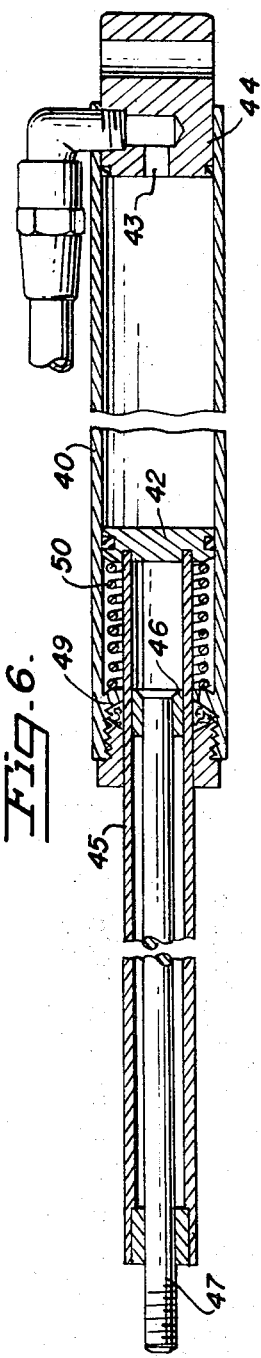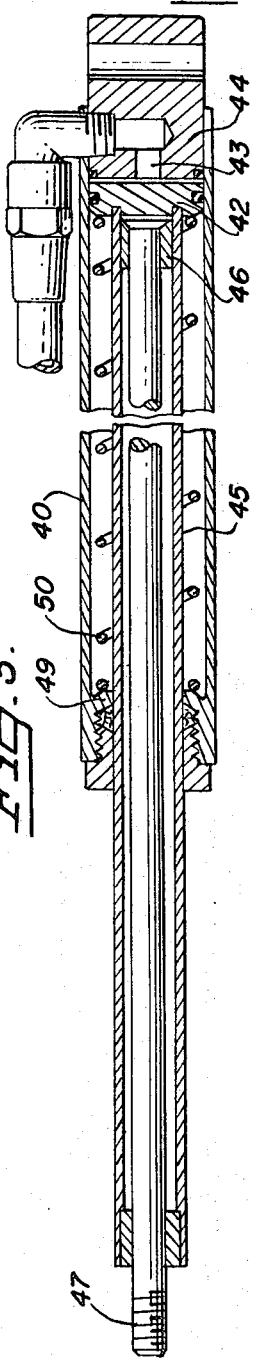

Dec. 31, 1968   G. U. BRUMBAUGH ET AL   3,419,099
TRUCK HOOD
Filed Nov. 7, 1966   Sheet 4 of 5
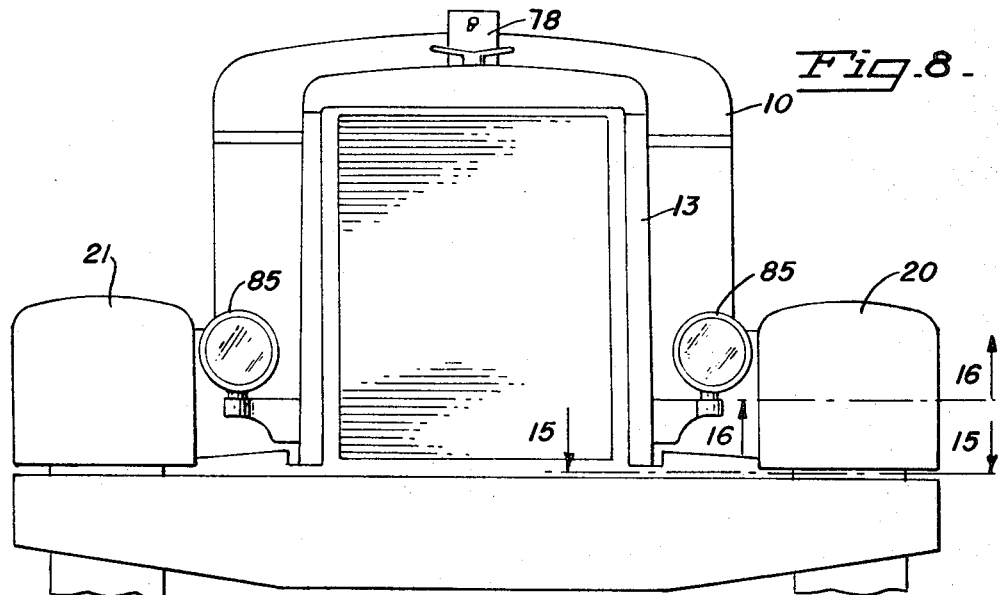
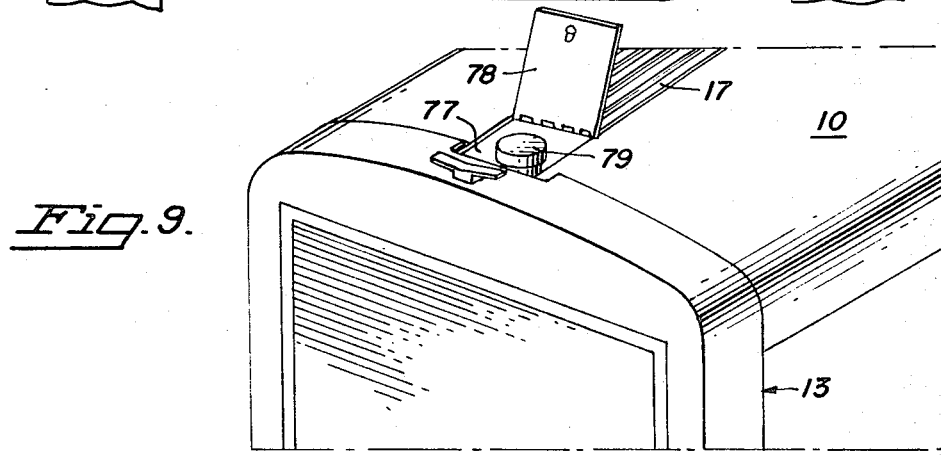
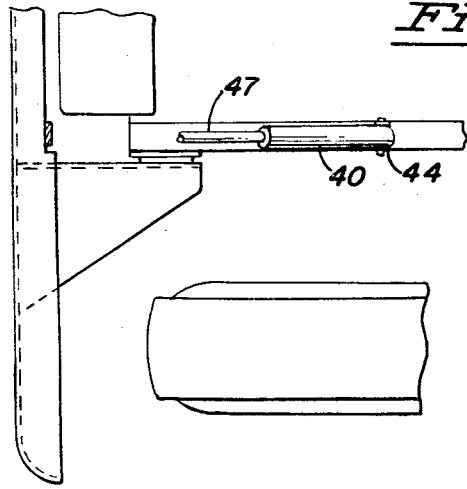
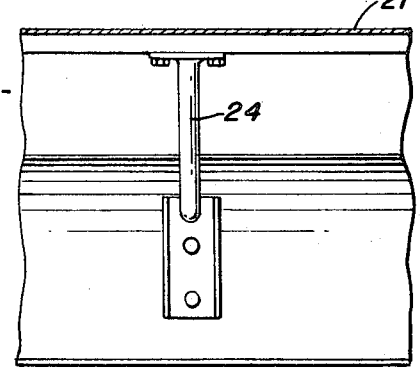
INVENTORS
GEORGE U. BRUMBAUGH
LARRY S. SHERMAN
HIDEO FURIYA
BY Owen, Wickersham & Erickson
ATTORNEYS

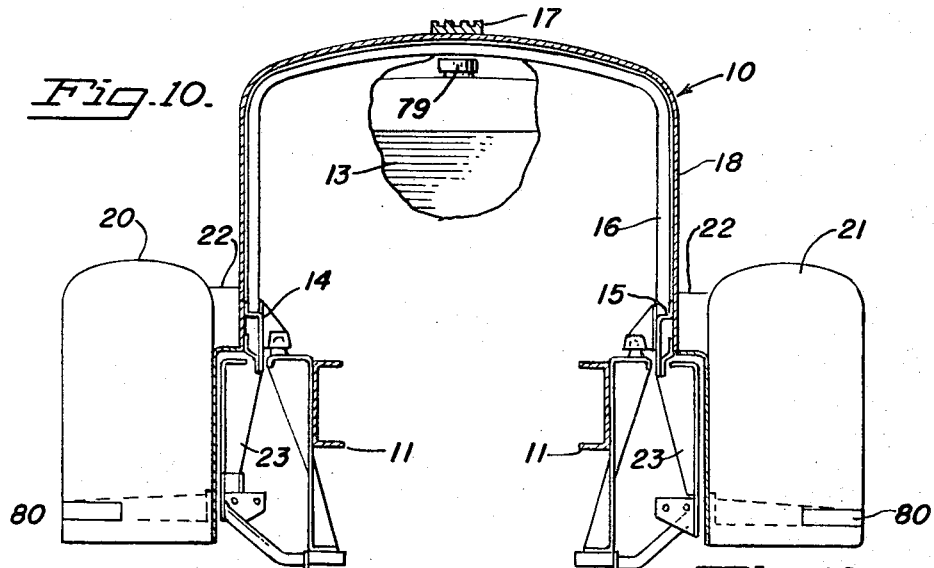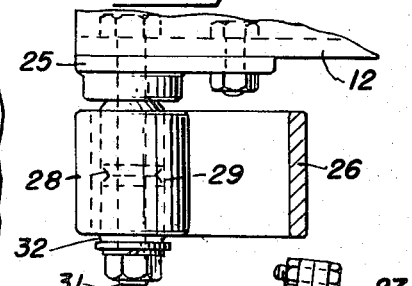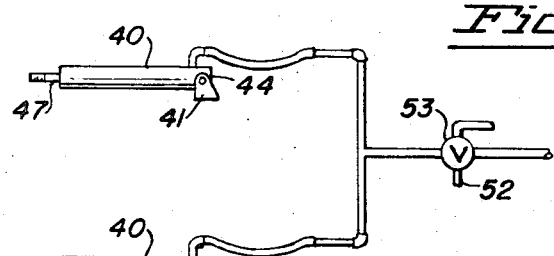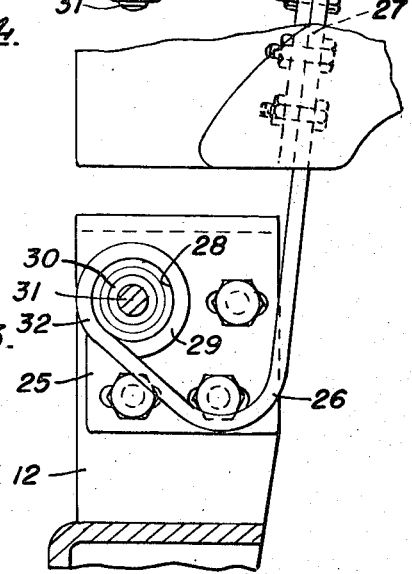

United States Patent Office 3,419,099
Patented Dec. 31, 1968

3,419,099
TRUCK HOOD
George U. Brumbaugh, Palo Alto, Larry S. Sherman, Castro Valley, and Hideo Furiya, Hayward, Calif., assignors to Pacific Car and Foundry Company (Peterbilt Motors Company Division), Renton, Wash., a corporation of Washington
Filed Nov. 7, 1966, Ser. No. 592,490
15 Claims. (Cl. 180—69)

ABSTRACT OF THE DISCLOSURE

A tilt hood for trucks and automobiles having assist means for helping a man to lift the hood manually. The front end of the hood is pivoted by a pair of tubular rubber covered bushings that are secured to the frame and a pair of leaf spring members around the bushings and secured to the hood. A pair of pneumatic cylinders are pivotally attached to the frame, while the pistons each have a hollow tube with a rod telescoped inside for free sliding movement between fixed limits. The rods are pivotally secured to a forward part of the hood. The pneumatic pressure is limited to an amount slightly less than that sufficient to raise the hood, and the stroke of the piston is enough to give assistance to manual force in raising the hood from the normal driving position to a locus just short of the point of balance beyond which the hood falls forward. The assist pressure will support the hood substantially at a position to which it has been raised. A bleed valve enables venting of the assist or support pressure for gravity return of the hood to its normal driving position. The rod limits the amount of motion of the hood past the balance point, when the hood is pulled beyond that point, and a spring gives a shock-absorbing cushion to the rod when the hood drops down forward. Other features enable adjustment of the pivot bushings relative to the frame, enable guided and shock-absorbing closure of the hood, and give access to the oil and water without having to raise the full hood.

---

This invention relates to improvements in tilt hoods for trucks and the like.

Large trucks, many of which have diesel engines, have very large hoods which must from time to time be opened by the driver for various well-known reasons. Although lightweight materials have now been used for some time in making tilt hoods, the hoods are still difficult to open because they are still heavy in view of the operator's mechanical disadvantage at his pull handle. On some occasions spring assists have been used, but these have not been satisfactory because they placed the pull on the hood when it was fastened. Other devices that have been tried have likewise proved unsatisfactory.

Most hoods for trucks have had to be opened, even for putting in water and oil, but the present invention enables such operations as these to be done without having to open the hood.

Truck hoods have often been a source of rattling and of disturbing vibrations, and the present invention solves this problem too by providing a system of vibration-dampening in combination with some of its fastening features.

Another problem in tilt hood trucks has been that due to air cleaners, oil filters, and mirrors hanging from the cab, it has been difficult to clean the windshield without first tilting the hood and then standing on the frame. In the present invention this problem, too, has been solved by providing a tilt-hood structure which provides places for the driver to stand when he cleans the windshield.

Yet another problem has related to the head lamp mounting for such trucks. Fender-mounted lights have tended to be vulnerable to accidents and have tended to flicker due to road vibration. In contrast, the present invention provides for a structure in which the head lamps are given a more solid mounting and an isolated installation, thereby reducing the vibration effect while also protecting them from non-serious accidents.

Another problem which the invention solves is that of stabilization of the fenders to prevent excess fender movement.

Still other objects and advantages of the invention will appear from the following description of a preferred embodiment.

In the drawings:

FIG. 3 is a fragmentary view in elevation of the other side of the same truck, with the hood shown in its open position.

FIG. 4 is a fragmentary view in perspective of a portion of the same side of the truck as FIG. 3, with the hood in closed position, showing access to the dipstick and oil fill tube through a door shown here in open position.

FIG. 5 is a view in elevation and in section, with a portion broken at the center in order to conserve space, of a pneumatic cylinder construction as used in the present invention in combination with a mechanical slide and spring-cushioned stop mechanism. The device is shown here in the position which it assumes when the hood is closed.

FIG. 6 is a view similar to FIG. 5 of the same device with the pneumatic portion shown in its fully extended position but with the mechanical slide means still in its closed position, this being the position assumed when the hood is in the partially open position shown in broken lines in FIG. 2.

FIG. 7 is a view similar to FIGS. 5 and 6 showing the mechanism in the fully open position also shown in solid lines in FIG. 2, where the hood is supported by the spring-cushioned stop.

FIG. 8 is a fragmentary view in front elevation of the hood and some adjacent structure.

FIG. 9 is a fragmentary view in perspective of the front portion of the hood and of the radiator, with the water-fill door shown in open position.

FIG. 10 is a view partly in rear elevation and partly in section of the hood assembly.

FIG. 11 is a pneumatic circuit diagram of the pneumatic hood-tilting means.

FIG. 12 is a fragmentary plan view of the tilting hinge, partly in section.

FIG. 13 is a view in elevation and in section of the hinge of FIG. 12.

FIG. 14 is a fragmentary top plan view of a portion of the hood arrangement.

FIG. 15 is a view in section taken on the line 15—15 in FIG. 8.

FIG. 16 is a view in section of one fender taken along the line 16—16 in FIG. 8.

Figure 1:
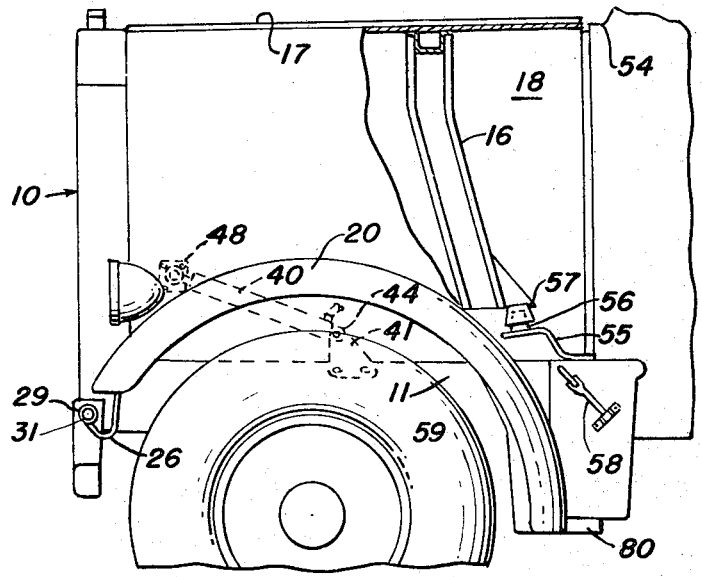
FIG. 1 is a fragmentary view in elevation and partly in section of the front part of a truck embodying the principles of the invention and having a tilt hood. The hood is shown in its closed position with some portions cut away to show interior construction.
Figure 2:
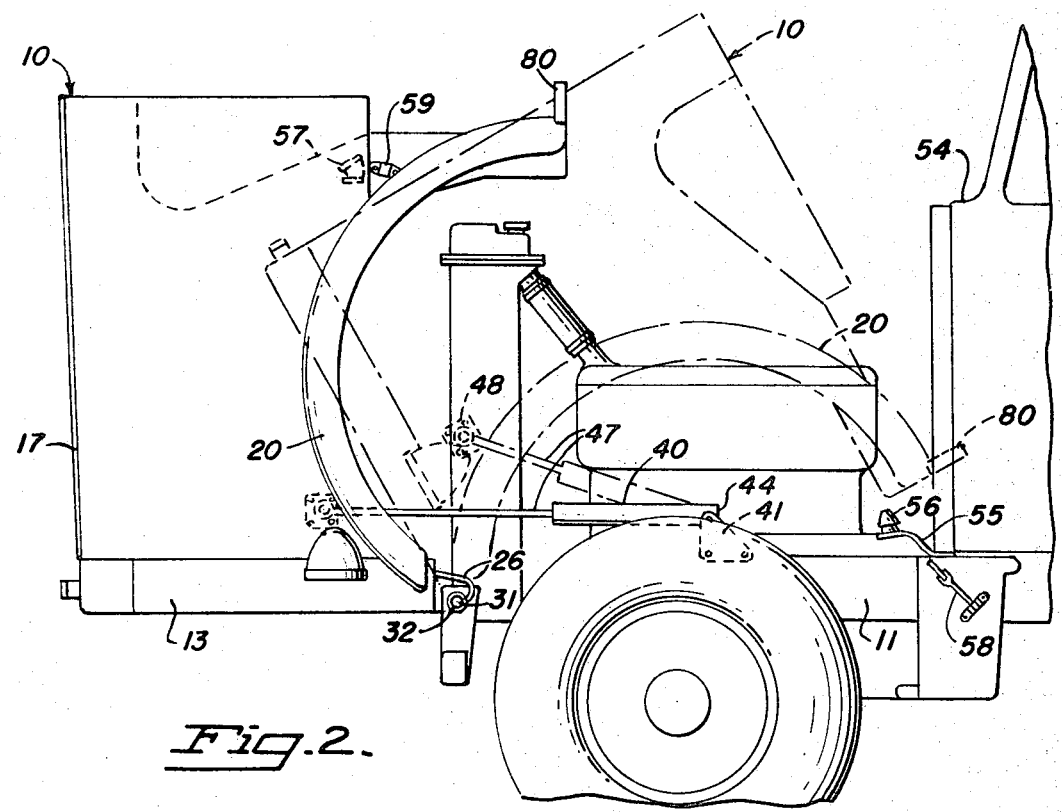
FIG. 2 is a view similar to FIG. 1 but showing the hood in two tilted positions: in broken lines the hood is shown in an initial partly open position to which the hood of the present invention is mechanically moved and in solid lines is shown a second, fully open position to which the hood is then manually swung by the driver.

FIGS. 1 to 4 show a portion of the front end of a large diesel engine truck embodying the principles of the invention and including a tilt hood 10 of the present invention, which is pivoted to a frame 11 at a pair of bumper brackets 12. The hood 10 is preferably all-metal, made up of many parts bolted and riveted together; most of the parts may be made from aluminum and steel used only at high-stress and high-wear points.

A basic center structure is provided from a three-piece cast-front hood shell 13 (see FIG. 8) with box section members 14 and 15 running horizontally to the rear (see FIG. 10). A box bridge member 16 (see FIGS. 1 and 10) passes between the members 14 and 15 across the top near the rear, to help maintain the rear width and shape. An extrusion 17 along the top center of the hood 10 gives additional structural strength and also an attractive design appearance. Most of the remainder is sheet metal 18. The hood 10 as a whole gives high beam strength while allowing some torsional flexing, so that it can follow the cab cowl as the truck frame is twisted.

A pair of fenders 20 and 21, which may be the same as those used on trucks without tilting hoods, are attached to the box section members 14 and 15 by a forward skirt 22 (FIG. 10), a rear box section skirt 23 (FIG. 10), and a tubular strut 24 (FIG. 16) at the center. The structure facilitates the repair of the fenders or their replacement and also the repair and replacement of related parts without having to replace the entire hood 10 every time one of those parts is damaged. It enables the manufacturer to offer either steel or aluminum fenders and enables the radiator and headlamp shells to be either polished or painted.

The front mounting parts are located just inside the bumper brackets 12 and are attached to them. A slotted hinge-support plate 25 for each hinge provides fore-and-aft adjustment relative to its bumper bracket 12 (FIGS. 12 and 13). A hook-shaped spring 26 is adjustable vertically relative to the hood 10 by another slot-and-bolt assembly 27 (FIG. 13). At each hinge is a rubber bushing 32 at the hinge line to provide isolation; it also provides alignment by a center ridge 28 in the pressed sleeve 29 of each spring 26. The rubber bushings 32 are of the center-bonded type having internal steel sleeves 30, and the sleeves 30 are secured to the hinge-support plate 25 and bracket 12 by a bolt 31, so that there is rotation only at their outer surfaces.

The tilting of the hood 10 is assisted by means of two pneumatic cylinders 40 which are designed in a novel manner. The cylinders 40 are secured to a portion of the main frame 11 by means of brackets 41 (FIGS. 1, 2 and 4) which enable relative rotation between the cylinder 40 and the bracket 41 to compensate for the rotational factor involved. A piston 42 is movable inside the cylinder 40 (FIGS. 5–7) by air admitted from a passage 43 at the rear end 44 of the cylinder 40. The cylinder 40 is single acting, being actuated by pumping air into the cylinder 40 via the rear passage 43 and being relieved by bleeding off the air. To the piston 42 is attached an inner cylinder 45 of a selected length, and inside the inner cylinder 45 is mounted a second piston 46 to which is attached a long connecting rod 47 somewhat longer than the inner cylinder 45 and pivotally attached to a bracket 48 secured to the hood 10, one bracket 48 being on each side of the hood 10. At the outer end of the outer cylinder 40 is a closure ring 49 against which abuts a coil spring 50.

The elements of this hood tilting mechanism are made of such length that when air is pumped into the outer cylinder 40, it will move the outer piston 42 toward the opposite end of the outer cylinder 40, compressing the spring 50, if and only if assisted manually. The hood 10 is thus manually raised with assistance from the cylinders 40 to the position shown in broken lines in FIG. 2, where it is just below the balance point. In other words, the hood 10 will stay in this position rather than falling over, but a relatively slight force applied to the hood can pull it beyond the balance point with its center of gravity passing forward of its balance line, and then the hood 10 will fall into the position shown in solid lines in FIG. 2, which is the fully open position. This is normally done by the driver simply giving a pull on the front of the hood 10, perferably grasping an ornamented pull handle 51 at the front of the hood 10. When he does this, the hood 10 carries with it the connecting rod 47 with its piston 46 moving inside of the inner cylinder 45 until the piston 46 reaches a stop position, and this stop position is cushioned by the coil spring 50. Thus, the free-sliding rod 47 enables the hood 10 to be pulled out to an extent corresponding to the length of the rod and cylinder assembly, and at this point the rod and cylinder assembly acts as a restraint to further tilting. The cushioning coil spring 50 means that there will be no shock if the driver simply initiates the operation and then lets it go on of its own weight. He cannot pull it beyond the stop position, and also he cannot prevent it being cushioned, so that the shock will be very light.

To return the hood 10 to normal position, the operator lifts it to its midway position, while still leaving the air on. This is easily done as the hood 10 in this position does not have a great force holding it back. He then has it just beyond the balance position again. By then releasing the air and allowing it to bleed out of the rear end 43 of the cylinder 40, the hood 10 itself pushes the piston 42 back and settles itself onto the cab cowl. It is not necessary to hold back the hood's descent, because this is done pneumatically by a metered orifice 52 in the bleed system.

It should be emphasized that the geometry and cylinder size are such that the pneumatic system acts only as an assistant and does not actually lift the hood by itself. The air to the pneumatic cylinders 40 may be supplied from the air system for truck brakes through a simple on-off valve 53 which may be located at any convenient place. Of course, if desired, a separate pneumatic system can be used, but this is unnecessary. It should be noted that in distinction to spring assist, the system of this invention works only when it is needed and is purposely used, and it does not impose any force on the hood structure when it is not being used. Since the cylinders 40 and 45 act as stops to full tilt, there is no need for any additional restraining device such as a cable or a folding link.

To the rear of the hood 10, just forward and inboard of the cowl 54 (see FIGS. 1 to 3), the frame 11 carries a pair of leaf-spring supports 55 on each of which is mounted a rubber cone 56. The cones 56 mate with matching metal cups 57 which are located on the hood side box structure and serve as sockets that engage the cones 56 and guide the hood 10 into its properly aligned seating position, as well as to prevent noise and vibration. The spring supports 55 also may be adjusted to relieve cowl loading. Hood clips 58 are provided to engage latches 59 to secure the hood 10 to the frame 11 when the hood 10 is closed.

Excess fender movement is eliminated by isolating the fenders 20 and 21 at the bottom. As shown best in FIG. 14, attached to the box rear skirt 23 is a channel shaped bracket 60 having an open leg 61 which guides itself between a pair of rubber rollers 62, 63. These rollers 62, 63 which are similar to the front mount bushings 32, are bolted to an adjustable bracket 64 at the stationary frame skirt panel. This arrangement enables vertical movement and fore-and-aft movement but restrains side motion. Up to one half the roller diameter of misalignment is tolerated.

The hood of this invention does not need to be tilted in order for the operator to add oil or to consult the dip stick. As shown in FIGS. 3 and 4, one side of the hood 10 is cut away to provide a recess 70, and the cowl 54 has, in effect, an extension plate 71 extending forwardly and serving to the air conduit 72 for the air cleaner 73. The plate 71 is provided with a door 74, which can be opened to gain access to an oil-fill tube 75 and a dip stick 76. By opening this door 74 the operator can check and fill his engine oil without having to tilt the hood 10.

Similarly, the operator does not need to open the hood 10 in order to check the radiator 77 or to fill it. At the top center of the hood, just beyond the front shell, is a radiator fill door 78, just to the rear of the handle 51 referred to earlier. This door 78 takes advantage of the center extrusion and provides accessibility, strength, and a pleasing appearance. The fill cap 79 lies just below it.

Most tilt-hood trucks make it difficult for the operator to clean the windshield without having first to tilt the hood and stand on the frame. This is partly because of the air cleaners, oil filters, and mirrors hanging from the cab. In the present invention a cast aluminum step 80 is provided on each fender on which the operator can stand while the hood is closed and clean the windshield.

The headlamps 85 are mounted to the main shell assembly, giving a solid but isolated installation.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A tilt hood for automotive vehicles having a frame, including in combination
   pivoting means attaching the front end of said hood to said frame,
   fluid pressure assist means including fluid-force-limiting means connected between said frame and said hood for supplying a force approaching but slightly less than an amount sufficient to raise the rear end of said hood about said pivoting means and therefore aiding in manually raising said hood rear end, said assist means supplying its said force over a stroke during which said hood is pivoted from a normal driving position to a locus just short of the point of balance beyond which said hood falls forward, said assist means supporting said hood substantially at a position to which it has been raised,
   means for gradually releasing the fluid pressure from said assist means to enable a gentle gravity return of the hood to its normal driving position, and
   means for limiting the amount of motion of said hood past said balance point when said hood has been pulled past said balance point.

2. The hood of claim 1 wherein said fluid pressure assist means comprises a pair of pneumatic cylinders pivotally supported on said frame, each said cylinder having a piston and a rod pivotally secured to said hood.

3. The hood of claim 1 wherein said fluid pressure assist means and said means for limiting comprise
   a pair of pneumatic cylinders, each pivotally attached to said frame and each having
   a piston and
   a hollow tube attached to said piston, and
   a rod telescopically secured in said tube for free sliding movement in and out of said tube between fixed limits, said rod being pivotally secured to said hood.

4. The hood of claim 3 having shock-absorbing spring means opposing extension of the rod-tube-cylinder to its combined maximum length.

5. The hood of claim 4 wherein said spring is in said cylinder around said tube and compressed between an end of said tube and the end of said cylinder toward which said tube moves during raising of said hood, said spring being fully compressed only after dropping the hood forward beyond its said point of balance has pulled out said rod to a fully extended position.

6. The hood of claim 1 wherein said pivoting means comprises
   a pair of tubular rubber-covered bushings secured to said frame and
   a pair of leaf-type springs each shaped to provide a cylindrical end around one said bushing and having another end secured to said hood.

7. The hood of claim 6 wherein to secure said bushings to said frame, said frame has
   a pair of bumper brackets having bolt openings,
   an adjustment plate having slotted bolt openings and bolts extending through said bushings and said bolt openings,
   thereby enabling adjustment of said bushings relative to said frame.

8. The hood of claim 6 wherein said springs are adjustably secured to said hood.

9. The hood of claim 1 wherein at the rear of said hood there are:
   a pair of leaf-spring support members each having an end supported by said frame and a free end,
   a generally conical rubber member supported on each said free end, and a pair of generally conical inverted cups supported by said hood for engagement with said conical rubber members when said hood is in the normal driving position.

10. The hood of claim 1 having
    a pair of roller guides mounted vertically on each side of said frame and
    a vertical member on each side of said hood for engagement with and in between said rollers to stabilize the hood in its normal driving position.

11. The hood of claim 1 for a vehicle having an engine beneath said hood, an air cleaner and an air duct leading thereto, an oil-fill tube and a dip stick, having on the vehicle
    a cowl which said hood abuts when in normal driving position,
    an extension of said cowl extending forwardly therefrom and generally vertical and having an air-duct receiving opening and a hinged door giving access to the oil fill tube and dip stick of the engine,
    said hood having a cut-out recess corresponding to said extension and mating therewith,
    whereby access is had to said dip stick and oil fill tube when the hood is in normal driving position.

12. The hood of claim 1 for a vehicle having a radiator with a water-fill opening, having
    a hinged door on said hood at the front top center to give access to the water fill for the radiator.

13. The hood of claim 1 wherein said hood carries with it a fender on each side.

14. The hood of claim 13 having at the rear end of each said fender a step for standing on to clean the windshield of the vehicle.

15. The hood of claim 1 wherein said means for limiting the amount of motion is an integral part of said assist means.

References Cited

UNITED STATES PATENTS

| | | | |
|---|---|---|---|
| 1,089,193 | 3/1914 | Ervien | 292—15 |
| 1,358,012 | 11/1920 | Martin | 292—15 |
| 1,736,048 | 11/1929 | Neikirk et al. | 92—113 XR |
| 1,981,093 | 11/1934 | Conarroe | 180—69 XR |
| 2,132,926 | 10/1938 | Best | 180—69 |
| 2,612,233 | 9/1952 | Newell | 180—69 |
| 2,699,223 | 1/1955 | Brumbaugh | 180—69 XR |
| 2,737,254 | 3/1956 | Bayley | 180—69 |
| 2,826,256 | 3/1958 | Haltenberger | 180—69 |
| 3,157,240 | 11/1964 | Chew | 180—69 |
| 3,174,575 | 3/1965 | May et al. | 180—69 |

FOREIGN PATENTS

| | | |
|---|---|---|
| 811,780 | 8/1951 | Germany. |
| 528,496 | 10/1940 | Great Britain. |

BENJAMIN HERSH, *Primary Examiner.*

MILTON L. SMITH, *Assistant Examiner.*

U.S. Cl. X.R.

92—113